United States Patent [19]

Orikasa et al.

[11] Patent Number: 4,748,209

[45] Date of Patent: May 31, 1988

[54] METHOD FOR IMPROVING IMPULSE DESTRUCTIVE STRENGTH OF ELECTRICAL INSULATING MATERIALS

[75] Inventors: Yuichi Orikasa; Shinji Kojima; Takashi Inoue, all of Yokohama; Kaoru Yamamoto; Atsushi Sato, both of Tokyo; Shigenobu Kawakami, Ichikawa, all of Japan

[73] Assignee: Nippon Petrochemicals Co., Ltd., Japan

[21] Appl. No.: 59,420

[22] Filed: Jun. 8, 1987

Related U.S. Application Data

[63] Continuation-in-part of Ser. No. 785,282, Oct. 7, 1985, abandoned.

[30] Foreign Application Priority Data

Oct. 9, 1987 [JP] Japan ................. 59-212268

[51] Int. Cl.⁴ ........................... C08F 212/08
[52] U.S. Cl. ...................... 525/240; 526/88; 526/347; 526/913; 174/110 SR; 174/137 B
[58] Field of Search ............ 525/240; 526/86, 347, 526/913, 88; 174/110 SR, 137 B

[56] References Cited

U.S. PATENT DOCUMENTS

| | | | |
|---|---|---|---|
| 3,293,233 | 12/1966 | Erchak, Jr. et al. | 526/86 |
| 3,888,709 | 6/1975 | Burk | 156/48 |
| 4,029,875 | 6/1977 | Gloriod et al. | 526/308 |
| 4,547,551 | 10/1985 | Bailey et al. | 525/240 |

FOREIGN PATENT DOCUMENTS

| | | | |
|---|---|---|---|
| 1206110 | 9/1986 | Japan | 526/347 |
| 0497643 | 12/1938 | United Kingdom | 526/347 |
| 1213416 | 11/1970 | United Kingdom | 526/86 |

*Primary Examiner*—Joseph L. Schofer
*Assistant Examiner*—F. M. Teskin
*Attorney, Agent, or Firm*—Ostrolenk, Faber, Gerb & Soffen

[57] ABSTRACT

The present invention provides a method for improving impulse destructive strength of an electrical insulating material which is characterized by employing, as the electrical insulating material, a random copolymer of a styrene series monomer and ethylene or a combination of ethylene and another ethylenic unsaturated monomer, or a composition in which the copolymer is blended with an ethylene series polymer, the copolymer being prepared by introducing, into a reaction system, the styrene series monomer selected from the group of styrene and single-ring substituted styrenes, ethylene or the combination of ethylene and the ethylenic unsaturated monomer and a polymerization initiator, the latter being introduced thereinto separately from at least the styrene series monomer, and subjecting these monomers to a high-pressure radical copolymerization under a polymerization pressure of 500 to 4,000 kg/cm² at a polymerization temperature of 50° to 400° C., the aforesaid polymer or composition satisfying the following (a) and (b):

(a) a content of the styrene series monomer in the copolymer or the composition being within the range of 0.01 to 1 mol %; and (b) a crystallinity of the copolymer or the composition being 30% or more in accordance with X-ray diffraction.

10 Claims, 2 Drawing Sheets

METHOD FOR IMPROVING IMPULSE DESTRUCTIVE STRENGTH OF ELECTRICAL INSULATING MATERIALS

BACKGROUND OF THE INVENTION

This is a continuation-in-part of application Ser. No. 785,282, filed Oct. 7, 1985, now abandoned.

1. Field of the Invention

The present invention relates to a method for sufficiently improving destructive strength to impulse voltage of electrical insulating materials.

2. Description of the Prior Art

Heretofore, a variety of plastic materials have been used as electrical insulating materials for power cables and the like. Among others, olefin polymers have particularly superior in electrical and mechanical properties, chemical stability and the like. Above all, low-density polyethylenes prepared by a high-pressure radical polymerization are inexpensive and have a low dielectric loss and good workability. In addition thereto, these polyethylenes can be improved in heat resistance when crosslinked, and in these polyethylenes, the tree phenomenon resulting from the contamination by foreign matter such as catalyst residues does not occur as often as in the case of a polyethylene prepared by ion polymerization. Since they have so many advantages, the low-density polyethylenes are utilized extensively as materials for electric wires and power cables.

A problem which is now present in such an insulating material for power cables is that the wall thickness of the material must be increased in proportion to increased voltage when a higher transmission voltage is required in accordance with the augmentation of transmission capacity which can be supposed. For example, in the polyethylene materials which are now used, insulating breakdown will occur unless the insulating layer is thickened to an extreme degree in order to withstand the higher voltage.

For the solution of this problem, various improved methods have been suggested. For example, some methods have been presented in which a graft polymerization of styrene and a polyethylene is made for the sake of improving destructive strength to impulse voltage particularly in a high-temperature area. One of these methods is disclosed in Japanese Patent Publication No. 18760/1979, but in the method disclosed, crosslinking of polyethylene must be carried out prior to or simultaneously with the graft polymerization of styrene and the molding method is thus limited, and there is a problem in that the product's impulse strength decreases in the low-temperature zone. Japanese Patent Provisional Publication No. 80605/1982 suggests a method in which ethylene polymer grains are impregnated and polymerized with an aromatic vinyl monomer in an aqueous suspension, but this method disadvantageously comprises a very complicated process.

Other methods have been further suggested in which a polyethylene or an olefin polymer is blended with an aromatic polymer such as a polystyrene (Japanese Patent Publication No. 20717/1963, and Japanese Patent Provisional Publication Nos. 142651/1975 and 54187/1977), but miscibility between the polyethylene or the olefin polymer and the styrene polymer is disadvantageously bad.

Another suggested method comprises adding a block copolymer of styrene and a conjugated diene to a polyethylene (Japanese Patent Provisional Publication No. 41884/1977), but this method leads to the deterioration of heat resistance and extrusion workability.

Also, a method of impregnating a polyethylene with an electrical insulating oil has been suggested (Japanese Patent Provisional Publication No. 33938/1974), but in this method, the impregnated electrical insulating oil will bleed out during long-term storage or due to changing ambient environments, so that the effect due to the oil will be impaired inconveniently.

SUMMARY OF THE INVENTION

As a result of intensive investigations to overcome the above-mentioned problems, the present invention has now been achieved. That is to say, an object of the present invention is to provide a method for increasing the destructive strength to an impulse voltage of electrical insulating materials.

DETAILED DESCRIPTION OF THE INVENTION

Figure 1:
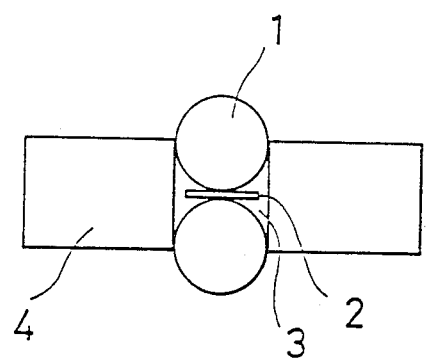
FIG. 1 is a schematic side view illustrating a Mckeown electrode for an impulse destructive test in the present invention.

An object of the present invention is to provide a method for improving the impulse destructive strength of an electrical insulating material which is characterized by employing, as the electrical insulating material, a random copolymer of a styrene series monomer and ethylene or a combination of ethylene and another ethylenically unsaturated monomer, or a composition in which the copolymer is blended with an ethylene series polymer, the copolymer being prepared by introducing, into a reaction system, the styrene series monomer selected from the group of styrene and single-ring substituted styrenes, ethylene or the combination of ethylene and the ethylenically unsaturated monomer and a polymerization initiator, the latter being introduced thereinto separately from at least the styrene monomer, and subjecting these monomers to a high-pressure radical copolymerization under a polymerization pressure of 500 to 4,000 kg/cm$^2$ at a polymerization temperature of 50° to 400° C., the aforesaid polymer or composition satisfying the following (a) and (b):

(a) a content of the styrene monomer in the copolymer or the composition being within the range of 0.01 to 1 mol %; and (b) a crystallinity of the copolymer or the composition being 30% or more in accordance with X-ray diffraction.

Examples of the styrene monomers used in the present invention include styrene, single-ring styrenes (for example, methylstyrene, dimethylstyrene, ethylstyrene, methoxystyrene, ethoxystyrene, vinylbenzoic acid, methyl vinylbenzoate, vinylbenzyl acetate, hydroxystyrene and divinylbenzene) and single-ring, α-substituted styrenes (for example, α-methylstyrene, α-ethylstyrene and α-chlorostyrene).

In the random copolymer (hereinafter referred to simply as ethylene copolymer) of ethylene and the styrene monomer or the composition in which the ethylene copolymer is blended with the ethylene polymer, the content of the styrene monomer is within the range of 0.01 to 1.0 mol %, preferably 0.02 to 0.7 mol %.

As described, the present invention also covers the ethylene copolymer composition in which the ethylene copolymer is blended with the ethylene polymer, and also in this composition, the content of the styrene monomer is to lie in the range of 0.01 to 1.0 mol %.

When the content of the styrene monomer is less than 0.01 mol %, the modification effect of the ethylene copolymer will scarcely be perceived; when it is in excess of 1.0 mol %, the impulse destructive strength will deteriorate.

The ethylene copolymer of the present invention means the copolymer of the styrene monomer and ethylene or the combination of ethylene and the other ethylenic unsaturated monomer, and examples of the ethylenic unsaturated monomers include propylene, butene-1, pentene-1, hexene-1, 4-methylpentene-1, octene-1, decene-1, vinyl acetate, ethyl acrylate, methacrylic acid, its esters and mixtures thereof.

The content of the ethylenically unsaturated monomer in the ethylene copolymer is within the range of 0 to 3 mol %, preferably 1 mol % or less.

The ethylene copolymer of the present invention may be manufactured by radical polymerization under a high pressure. Here, the radical polymerization under a high pressure just referred to means a method which comprises carrying out polymerization at a polymerization pressure of 500 to 4,000 kg/cm$^2$, preferably 1,000 to 3,500 kg/cm$^2$ at a reaction temperature of 50° to 400° C., preferably 100° to 350° C. in the presence of a free radical catalyst (polymerization initiator), a chain transfer agent, and if desired, assistants in an autoclave type of a tube type reactor.

The most important thing at the time of the above-mentioned radical polymerization is that at least the styrene monomer and the polymerization initiator should be separately introduced into the reaction system. A preferable introduction manner may comprise dispersing the styrene monomer into ethylene prior to their introduction thereinto, or placing the polymerization initiator in the reaction system after ethylene and the styrene monomer have been mixed with each other by stirring in the reactor so as to sufficiently disperse the styrene monomer into ethylene. The thus prepared copolymer of the present invention has a structure in which styrene or the styrene monomer is scattered in its polymeric chains at random, with the result that electrical properties can be improved remarkably.

On the other hand, in U.S. Pat. No. 4,029,875, there is disclosed a method in which polymerization or copolymerization of ethylene is carried out by an addition of 500 ppm or less of styrene or a styrene homologous compound having an alkyl-substituted group on a benzene nucleus with respect to the weight of ethylene at a temperature of 220° C. or more at a pressure of 1,000 bars or more in an autoclave reactor equipped with a stirrer. With the aim of reducing consumption of the reaction initiator and the styrene compound are dissolvingly mixed with each other previously and the resultant mixture is then poured into the reactor. Therefore, a copolymer prepared by this method just described is different in structure from the copolymer of the present invention which can be obtained by, for example, sufficiently uniformly dispersing the styrene monomer into ethylene prior to mixing the initiator with the styrene monomer.

Examples of the above-mentioned free radical catalysts include usual initiators such as peroxides, hydroperoxides, azo-compounds, amine oxide compounds and oxygen.

Further, examples of the chain transfer agents include hydrogen; propylene; butene-1; saturated aliphatic hydrocarbons having 1 to 20 or more carbon atoms and hydrocarbons substituted by halogen atoms, for example, methane, ethane, propane, butane, isobutane, n-hexane, n-heptane, cycloparaffins, chloroform and carbon tetrachloride; saturated aliphatic alcohols having 1 to 20 or more carbon atoms, for example, methanol, ethanol, propanol and isopropanol; saturated aliphatic carbonyl compounds having 1 to 20 or more carbon atoms, for example, acetone and methyl ethyl ketone; and saturated aromatic compounds other than mentioned above, for example, toluene, diethylbenzene and xylene.

The present invention contemplates the improvement of insulating power by introducing the styrene monomer into the ethylene polymer, but when the content of the styrene monomer is too high, the impulse destructive strength will be poor. This may be presumed to be because of the deterioration in the crystallinity of the ethylene copolymer by the steric hindrance of the styrene monomer. Therefore, in order to improve the impulse destructive strength, it is required to use the styrene monomer in an amount within a range in which the crystallinity of the ethylene copolymer will not be lowered noticeably.

The polyethylene, which has heretofore been used widely as an insulating material for power cables and the like, becomes poor in destructive strength to impulse voltage (impulse destructive strength) when its crystallinity is lowered, and it will also become poor in workability when its crystallinity is contrarily heightened. Generally, it is known that if a foreign component is introduced into the chain of the polyethylene, its crystallinity will deteriorate due to steric hindrance. The inventors of the present application, however, have found that if an aromatic ring is incorporated into the chain of the polymer in an extremely small and specific proportion within a certain range, the impulse destructive strength will increase even though the crystallinity will decrease. That is to say, it has been found that the proportion of the aromatic ring present in the ethylene polymer chain and the crystallinity of the ethylene polymer, when within a certain range, permit improving the impulse destructive strength. This improvement effect can be perceived within an extensive range of from low temperatures to high temperatures, and in particular, the aforesaid effect is remarkable at high temperatures.

It is important that the above-mentioned ethylene copolymer preferably has a crystallinity of 30% or more in accordance with X-ray diffraction. Preferably, the fall in proportion of this crystallinity is restrained up to 25% of a drop in the crystallinity of an ethylene homopolymer having no aromatic ring prepared under substantially the same conditions as in the above ethylene copolymer. The upper limit of the crystallinity is naturally fixed at the level of crystallinity of the ethylene homopolymer obtained under substantially the same conditions as in the ethylene copolymer. However, when the crystallinity of the ethylene copolymer is les than 30%, its impulse destructive strength will be rather lower and its volume resistivity will also be lower, as compared with the ethylene homopolymer. In the present invention, it is necessary to simultaneously satisfy the content of the unit having the aromatic rings and the crystallinity of the ethylene polymer.

The density of the ethylene copolymer of the present invention preferably is within the range of 0.890 to 0.950 g/cm$^3$. Further, its melt index (hereinafter referred to as MI) preferably is within the range of 0.05 to 50 g/10 minutes, more preferably 0.1 to 20 g/10 minutes.

Further, a composition in which another ethylene polymer is blended with the above-mentioned copolymer is also within the scope of the present invention, and also in this composition, the requirements regarding the aforesaid styrene monomer content and crystallinity must be fulfilled.

Examples of the other ethylene polymers which can be mixed with the ethylene copolymer include ethylene homopolymers; copolymers of ethylene and α-olefins each having 3 to 12 carbon atoms such as propylene, butene-1, pentene-1, hexene-1, 4-methylpentene-1, octene-1 and decene-1; copolymers of ethylene and polar group-containing monomers such as vinyl acetate, acrylic acid, ethyl acrylate, methacrylic acid, ethyl methacrylate, maleic acid and maleic anhydride; polymers prepared by modifying the ethylene homopolymers or copolymers of ethylene and α-olefins with unsaturated carboxylic acids such as acrylic acid, maleic acid and their derivatives; and their mixtures.

The ethylene copolymer or the ethylene copolymer composition containing another ethylene copolymer of the present invention, which can be manufactured as just described, can exhibit excellent insulating properties, when used as an electrical insulating material, and in particular, it has a good destructive strength to impulse voltage in a high-temperature zone. Therefore, the copolymer of the present invention is very useful as an insulating material for extra-high voltage power cables.

Further, the copolymer of the present invention can be prepared in accordance with a relatively simple process which is the copolymerization, and this process does not require intricate graft and blending steps, which fact also is very convenient.

To the ethylene copolymer or the ethylene copolymer composition of the present invention, other compounds may be added, so long as the properties are not impaired remarkably, and examples of such addable compounds include olefin polymers (inclusive of copolymers) except for the above-mentioned ethylene polymers; thermoplastic resins such as polyacrylonitriles, polyamides, polycarbonates, ABS resins, polystyrenes, polyphenylene oxides, polyvinyl alcohol resins, vinyl chloride resins, vinylidene chloride resins and polyester resins; petroleum resins; cumarone-indene resins; synthetic rubbers such as ethylene-propylene copolymer rubbers (EPR, EPDM and the like), SBR, NBR, butadiene rubber, IIR, chloroprene rubber, isoprene rubber, styrene-butadiene-styrene block copolymers; and natural rubbers. These compounds may be used alone or in a combination thereof.

Furthermore, in the present invention, additives may be added thereto so long as the effects of the present case are not damaged remarkably, and examples of such additives include an organic or an inorganic filler, an antioxidant, a lubricant, organic and inorganic various pigments, an ultraviolet stabilizer, a dispersant, a copper de-activator, a neutralizer, a blowing agent, a plasticizer, a foam inhibitor, a flame retarder, a crosslinking agent, an improver for flow properties, an improver for weld strength and a nucleating agent.

The ethylene copolymer or the composition containing it, with which the present invention is concerned, may be used in an uncrosslinking state, or if desired, it may be employed after being crosslinked. Such a crosslinking treatment may be carried out in the usual crosslinking manner.

Now, the present invention will be described in detail with reference to examples.

EXAMPLES 1 to 5

Predetermined amounts of ethylene, styrene and n-hexane (a chain transfer agent) were placed in a metallic autoclave equipped with a stirrer in which the atmosphere had previously been replaced sufficiently with nitrogen and ethylene, and they were then sufficiently mixed by stirring. Afterward, di-tertiary-butyl peroxide (a polymerization initiator) was added thereto. Polymerization was then carried out at a polymerization temperature of 170° C. at a polymerization pressure of 1,700 kg/cm$^2$ for 60 minutes in order to prepare ethylene copolymers having different styrene contents as set forth in Table 1. For the respective produced ethylene copolymers, impulse destructive strength was measured at 20° C. and 80° C., and the results are set forth in Table 1.

EXAMPLES 6 and 7

The procedure of Example 1 was repeated for polymerization with the exception that predetermined amounts of ethylene and styrene were previously mixed to uniformly disperse styrene into ethylene in a bomb and the resultant dispersion was introduced into the autoclave. The evaluated results are set forth in Table 1.

EXAMPLE 8

The polymerization procedure of Example 1 was repeated with the exception that α-methylstyrene was used in place of styrene, and the evaluated results are set forth in Table 1.

COMPARATIVE EXAMPLE 1

The polymerization procedure of Example 1 was repeated to produce an ethylene homopolymer, and for the latter, impulse destructive strength was measured in the same manner as in Example 1. The results are set forth in Table 1.

COMPARATIVE EXAMPLES 2 and 3

The procedure of Example 1 was repeated to prepare ethylene copolymers shown in Table 1, and impulse destructive strength was measured. The results are set forth in Table 1.

COMPARATIVE EXAMPLE 4

The polymerization procedure of Example 1 was repeated with the exception that the polymerization temperature of 170° C., the polymerization pressure of 1,700 kg/cm$^2$ and the n-hexane chain transfer agent were replaced with 230° C., 1,000 kg/cm$^2$ and propylene, respectively, in order to produce an ethylene copolymer having a low crystallinity. An impulse destructive test was then carried out in the same manner as in Example 1, and the evaluated results are set forth in Table 1.

COMPARATIVE EXAMPLE 5

In accordance with a method described in U.S. Pat. No. 4,029,875, polymerization was carried out by the use of the same reactor as in Example 1. That is to say, predetermined amounts of ethylene and n-hexane (a chain transfer agent) were placed in the reactor, and a solution prepared by dissolving styrene in a di-tertiary-butyl peroxide liquid (a polymerization initiator) and heated up to 140° C. was then introduced into the reactor in order to accomplish polymerization at a polymerization temperature of 260° C. and a polymerization pressure of 1,300 kg/cm$^2$. At this time, a concentration of styrene in the reactor was as high as 250 ppm.

For the ethylene copolymer produced through the aforesaid reaction, impulse destructive strength was measured in the same manner as in Example 1, and the results are set forth in Table 1.

EXAMPLE 9

Under the same conditions as in Example 1, an ethylene-styrene copolymer having a styrene content of which was 4 mol % was prepared. By the use of a plastagraph, 5.5 parts by weight of the thus prepared ethylene copolymer were kneaded with 94.5 parts by weight of the low density polyethylene employed in Comparative Example 1 to form an ethylene copolymer composition having a styrene content of 0.2 mol %. Table 1 also sets forth the measurements of impulse destructive strength of the ethylene copolymer composition.

EVALUATION

The results in Table 1 indicate that the copolymers in Examples 1 to 8 regarding the present inventions were better in destructive strength than the conventional high-pressure low-density polyethylene (Comparative Example 1), particularly at high temperatures.

As understood from the results of Example 9, an ethylene copolymer composition was provided with the improvement effect when the content of styrene was within the certain range of the present invention.

On the other hand, in Comparative Examples 2 and 3 in which the content of styrene deviated from the specified range of the present invention, no improvement effect was perceived.

Also in Comparative Example 4, a copolymer having a crystallinity of less than 30% was not improved in impulse destructive strength.

Further, in Comparative Example 5, since the previously prepared mixture of the reaction initiator and styrene was introduced into the reactor, the used styrene was not dispersed in ethylene sufficiently that improvement effect of impulse destructive strength was perceived in the produced copolymer.

Moreover, the structure of the ethylene copolymer obtained in Example 7 regarding the present invention was elucidated in accordance with NMR analysis, and as a result, it was found that the ethylene copolymer had a random structure comprising 86% of the ethylene-styrene-ethylene structure in which isolated styrene was present in polymer chains and 14% of the ethylene-styrene-styrene-ethylene structure in which the two-molecule block polymerization of styrene was made.

The impulse destructive strength test was carried out in the following manner: As an electrode system, there was used a so-called McKeown electrode (FIG. 1) which was a kind of stationary electrode. A base plate 4 of the electrode system was made of polymethyl methacrylate and was provided at its central portion with a hole having a diameter of ½ inch. The electrodes were stainless steel balls 1 each having a diameter of ½ inch. A sample 2 of about 8 to 10 mm square was interposed between the electrodes. Spaces between the sample 2 and the electrodes were packed with a deaerated epoxy resin 3, and the latter was then cured. The thus constructed Mckeown electrode was dipped in a vessel filled with silicone oil and was then placed in a thermostat, and measurement was carried out. The waveform used for the destruction was 1×40 μS negative impulse waveform. The waveform was observed by means of an oscilloscope, and data was collected on the basis of the destruction at its wave front and average values of 20 points or more were taken.

TABLE 1

| | Composition | | Styrene monomer | | MI | Crystallinity by X-ray diffraction (%) | Impulse destructive strength (MV/cm) | |
| | Copolymer (parts by weight) | LDPE (parts by weight) | Kind | Content (mol %) | (g/10 min) | | 20° C. | 80° C. |
| --- | --- | --- | --- | --- | --- | --- | --- | --- |
| Example 1 | 100 | — | Styrene | 0.05 | 3.0 | 54 | 6.14 | 4.56 |
| Example 2 | 100 | — | Styrene | 0.07 | 2.0 | 53 | 6.20 | 4.60 |
| Example 3 | 100 | — | Styrene | 0.08 | 3.1 | 52 | 6.19 | 4.59 |
| Example 4 | 100 | — | Styrene | 0.1 | 2.8 | 50 | 6.27 | 4.63 |
| Example 5 | 100 | — | Styrene | 0.2 | 3.0 | 49 | 6.26 | 4.61 |
| Example 6 | 100 | — | Styrene | 0.5 | 3.1 | 47 | 6.26 | 4.60 |
| Example 7 | 100 | — | Styrene | 0.8 | 2.9 | 45 | 6.13 | 4.55 |
| Example 8 | 100 | — | α-Methyl styrene | 0.08 | 2.9 | 50 | 6.15 | 4.57 |
| Example 9 | 5.5 | 94.5 | Styrene | 0.2 | 3.0 | 48 | 6.15 | 4.58 |
| Comp. Ex. 1 | — | 100 | — | — | 3.0 | 57 | 6.03 | 3.50 |
| Comp. Ex. 2 | 100 | — | Styrene | 0.005 | 2.8 | 55 | 6.01 | 3.50 |
| Comp. Ex. 3 | 100 | — | Styrene | 2 | 2.9 | 38 | 5.96 | 3.32 |
| Comp. Ex. 4 | 100 | — | Styrene | 0.8 | 3.0 | 27 | 5.93 | 3.35 |
| Comp. Ex. 5 | 100 | — | Styrene | 0.02 | 3.0 | 44 | 5.95 | 3.40 |

EXAMPLE 10

In order to elucidate structure and electrical properties (impulse destructive strength) of ethylene copolymers prepared by the method of the present invention and the method of Gloriod et al. U.S. Pat. No. 4,029,875, the following comparative tests were performed.

COMPARATIVE TEST 1

Polymerization was carried out by the method of the present invention to prepare an ethylene copolymer. The atmosphere in a 3.8 liter autoclave equipped with a stirrer was replaced with nitrogen and ethylene sufficiently, and 1.7 kg of ethylene, 2 g of styrene and 250 g of n-hexane (a chain transfer agent) were placed and mixed well in the autoclave. Then, 5 mg of ditertiary butyl peroxide was placed therein to begin the polymerization. The polymerization temperature was 170° C., and the pressure at the beginning of the polymerization was 1,600 kg/cm². The polymerization finished when 30 minutes had elapsed since its start, and the resulting polymer was taken out from the autoclave. The amount of the produced polymer was 40 g.

A part of this polymer was dissolved in heated toluene, and the resulting solution was added to a large amount of methanol in order to thereby precipitate the polymer. The latter was then separated by filtration and was afterward heated under a reduced pressure for the sake of drying.

The melt flow rate (MFR) of the obtained polymer was 1.6 g/10 min (in conformity with ASTM D 1238) (hereinafter referred to as Sample 1).

COMPARATIVE TEST 2

This test was carried out using a polymer made in accordance with the method of Gloriod et al. (Example 4 of U.S. Pat. No. 4,029,875).

The atmosphere in the same autoclave as in Comparative Test 1 was replaced with nitrogen and ethylene thoroughly, and 1.7 kg of ethylene and 30 g of n-hexane were placed in the autoclave. A solution in which 5 mg of di-tertiary butyl peroxide as polymerization initiator and 2 g of styrene were dissolved in a $C_{12}$ to $C_{15}$ aliphatic hydrocarbon was heated up to 140° C., the heated solution was then introduced into the autoclave and polymerization was thereby started. The polymerization temperature was 260° C., and the pressure at the beginning of the polymerization was 1,600 kg/cm². The polymerization was over when 5 minutes had elapsed since the polymerization start, and the resulting polymer was taken out from the autoclave. The amount of the produced polymer was 49 g.

A part of the thus protected polymer was purified in the same manner as in Comparative Test 1.

The melt flow rate (MFR) of the obtained polymer was 2.1 g/10 min (hereinafter referred to as Sample 2).

To determine the arrangement of styrene units in the polymer molecule, Samples 1 and 2 which were the purified polymers were analyzed by means of a $^{13}C$-NMR spectroscopy. Conditions for measurement were as follows:

$^{13}C$-NMR Device: FX-400; JEOL, Ltd.
Resonance Frequency: 100.4 MHz
Cumulative Number of Times: 8,700 Times
Solvent: ODCB (orthodichlorobenzene)
Measurement Temperature: 120° C.

RESULTS

In Gloriod's method, the amount of the styrene homologue was 500 ppm or less with respect to ethylene. For this reason, the content of the copolymerized styrene homologue in the polymer prepared by this method was extremely low, and it was impossible to analyze the structure of the styrene homologue in the obtained polymer.

Thus in Comparative Test 2, the same procedure as in the method of the Gloriod patent was repeated with the exception that the amount of styrene with respect to ethylene was increased only so as to enable the structural analysis of the prepared polymer by means of $^{13}C$-NMR spectroscopy. Therefore, it can be considered that the polymer prepared in Comparative Test 2 was substantially similar in fundamental structure to the polymer prepared by the Gloriod method, though both the polymers were not quite identical.

Therefore, it can be believed that a structural difference between the polymer prepared by the present invention (i.e., the polymer in Comparative Test 1) and the polymer prepared in Comparative Test 2 was comparable to a difference between the polymers by the present invention and the Gloriod method.

ANALYSIS OF SAMPLE 1

In Sample 1, there was observed signals (with chemical shifts) of 29.9, 14.1, 22.8, 23.3, 27.7, 30.04, 34.5 and 38.1 ppm, which are seen in an ethylene homopolymer, and signals of 126.0 and 146.8 ppm which were concerned with aromatic ring carbons.

In a saturated carbon region, signals of 27.9, 37.2, 44.0 and 46.5 ppm were seen which would not be observed in the ethylene homopolymer.

These signals in the saturated carbon region are assigned as follows:

In the arrangement -(ethylene)-(ethylene)-(styrene)-(ethylene)-(ethylene)-is

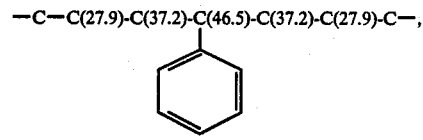

wherein the unit of the values is "ppm". In the arrangement -(ethylene)-(styrene)-(styrene)-(ethylene) is

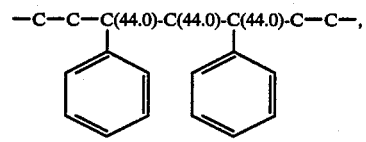

wherein the unit of the values is "ppm".

Further, the expected chemical shifts of the carbon atoms in the arrangement -(ethylene)-(styrene)-(styrene)-(styrene)-(ethylene)-are

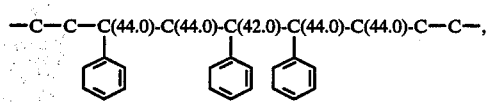

wherein the unit of the values is "ppm".

However, the signal corresponding to 42.0 ppm was not observed, and therefore this arrangement is considered to be absent.

From strength ratios between the signals assigned thereto and the signals of all the saturated carbons, the content of all the copolymerized styrene and proportions of the styrene contained in the respective arrangements were calculated, and the results are set forth in Table 1.

ANALYSIS OF SAMPLE 2

In Sample 2, there were observed signals of 29.9, 14.1, 22.8, 23.3, 27.7, 30.04, 34.5 and 38.1 ppm, as seen in an ethylene homopolymer, and signals of 126.0 and 146.8 ppm corresponding to aromatic carbons.

Further, in the saturated carbon range, signals of 27.9, 37.2, 44.0 and 46.5 ppm were observed, as in Sample 1.

In addition, a signal of 42.0 ppm and several small signals of 41 to 46 ppm were seen which could not be confirmed in Sample 1. The assignment of the signals of 27.9, 37.2, 44.0 and 46.5 ppm can be considered to be the same as in Sample 1.

The signal of 42.0 ppm is believed to be assigned to the carbon having an asterisk in the following arrangement taken up in the above description regarding Sample 1:

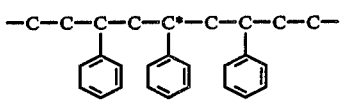

for -(ethylene)-(styrene)-(styrene)-(ethylene)-.

Several small but intensive signals of 41 to 46 ppm are considered to be assigned to an arrangement in which four or more styrene units are bonded in series as follows:

-(ethylene)- [C(41 to 42)-C(41 to 46)-]n-

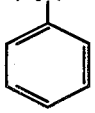

wherein the unit of the values is "ppm" and n≧4.

From strength ratios between the signals assigned thereto and the signals of all the saturated carbons, a content of all the copolymerized styrene, and from ratios of the respective signals, proportions of the styrene contained in the respective arrangements were calculated. The results are set forth in Table 2.

and in Comparative Test 2-1, a sample was newly polymerized for the test.

TABLE 3

| Sample No. | MFR (g/10 min) | Content of Styrene (mol %) | Impulse Destructive Strength (MV/cm) (80° C.) |
|---|---|---|---|
| Comp. Ex. 1 | 3.0 | 0.000 | 3.50 |
| Comp. Ex. 2 | 2.8 | 0.005 | 3.50 |
| Comp. Test 1-1 | 2.5 | 0.007 | 3.44 |
| Comp. Test 1-2 | 3.3 | 0.010 | 4.26 |
| Comp. Test 1-3 | 3.3 | 0.020 | 4.26 |
| Example 1 | 3.0 | 0.050 | 4.56 |
| Example 2 | 2.9 | 0.070 | 4.60 |
| Example 3 | 3.1 | 0.080 | 4.59 |
| Example 4 | 2.8 | 0.100 | 4.63 |
| Example 5 | 3.0 | 0.200 | 4.61 |
| Comp. Test 1-0 | 1.6 | 0.370 | 4.64 |
| Comp. Test 1-4 | 3.5 | 0.510 | 4.50 |
| Comp. Test 1-5 | 2.9 | 0.930 | 3.88 |
| Comp. Ex. 3 | 2.9 | 2.000 | 3.32 |

TABLE 4

| Sample No. | MFR (g/10 min) | Content of Styrene (mol %) | Impulse Destructive Strength (MV/cm) (80° C.) |
|---|---|---|---|
| Comp. Ex. 5 | 3.0 | 0.020 | 3.40 |
| Comp. Test 2-1 | 2.7 | 0.060 | 3.50 |
| Comp. Test 2-0 | 2.1 | 0.300 | 3.46 |

CONCLUSION

As shown in Table 2, the results of the comparative tests just described are identical with the analytical results in Example 7 of the present invention. That is,

TABLE 2

| Sample No. | Ethylene-Styrene Copolymer | | Arrangement | | | |
| | MFR (g/10 min) | Content of All Styrene (mol %) | —E—E—S—E—E— (%) | —E—S—S—E— (%) | —E—S—S—S—E— (%) | —E—(S)n— (n ≧ 4) (%) |
|---|---|---|---|---|---|---|
| 1 | 1.6 | 0.37 | 92 | 8 | 0 | 0 |
| 2 | 2.1 | 0.30 | 59 | 22 | 9 | 10 |

E: Ethylene unit
S: Styrene unit

MEASUREMENT OF IMPULSE DESTRUCTIVE STRENGTH

In the same manner as in Comparative Test 1, ethylene was copolymerized with styrene to prepare several copolymers a styrene content of which was different. For these copolymers, impulse destructive strength at 80° C. was measured by the procedure described heretofore in the examples. The results are set forth in Table 3 together with the other results which have already been shown in these examples. In addition, the detailed data (Comparative Tests 1-0 to 1-5) were plotted into a curve 1 in FIG. 2 in order to elucidate the effect of the present invention.

Further, in the same manner as in Comparative Test 2, ethylene was copolymerized with styrene to prepare several copolymers whose styrene content of which was different. These copolymers were evaluated by the same procedure as in Comparative Test 1. The results (Comparative Tests 2-0 and 2-1) are set forth in Table 4 as a curve 2 in FIG. 2.

In this case, in Comparative Test 1-0, Sample 1 was employed, and in Comparative Tests 1-1, 1-2, 1-3, 1-4 and 1-5, samples were newly polymerized for these tests. In Comparative Test 2-0, Sample 2 was employed, the results of the 13C-NMR analysis indicate that in the ethylene-styrene copolymer (Sample 1) prepared by the method of the present invention, most of the styrene units are isolated from each other. This fact means that the styrene moieties are bonded at random in the copolymer.

On the contrary, with regard to the copolymer (Sample 2) prepared by the method of the Gloriod patent, the isolated styrene units are smaller than in Sample 1 and thus the styrene moieties are copolymerized as blocks in a high proportion, though Sample 1 is not very different from Sample 2 in total styrene content in the copolymer.

As is apparent from the foregoing, the copolymers of Comparative Tests 1 and 2 are vastly different from each other in styrene arrangement, and therefore it is fair to say that both the copolymers have distinct structures.

The cause of this difference is not definite, but in Comparative Test 2, the polymerization initiator and styrene are mixed and then heated, and these materials are introduced simultaneously into the autoclave and are then polymerized at the high temperature. Therefore, the above difference can be considered to be attributable to these operational requirements.

Figure 2:
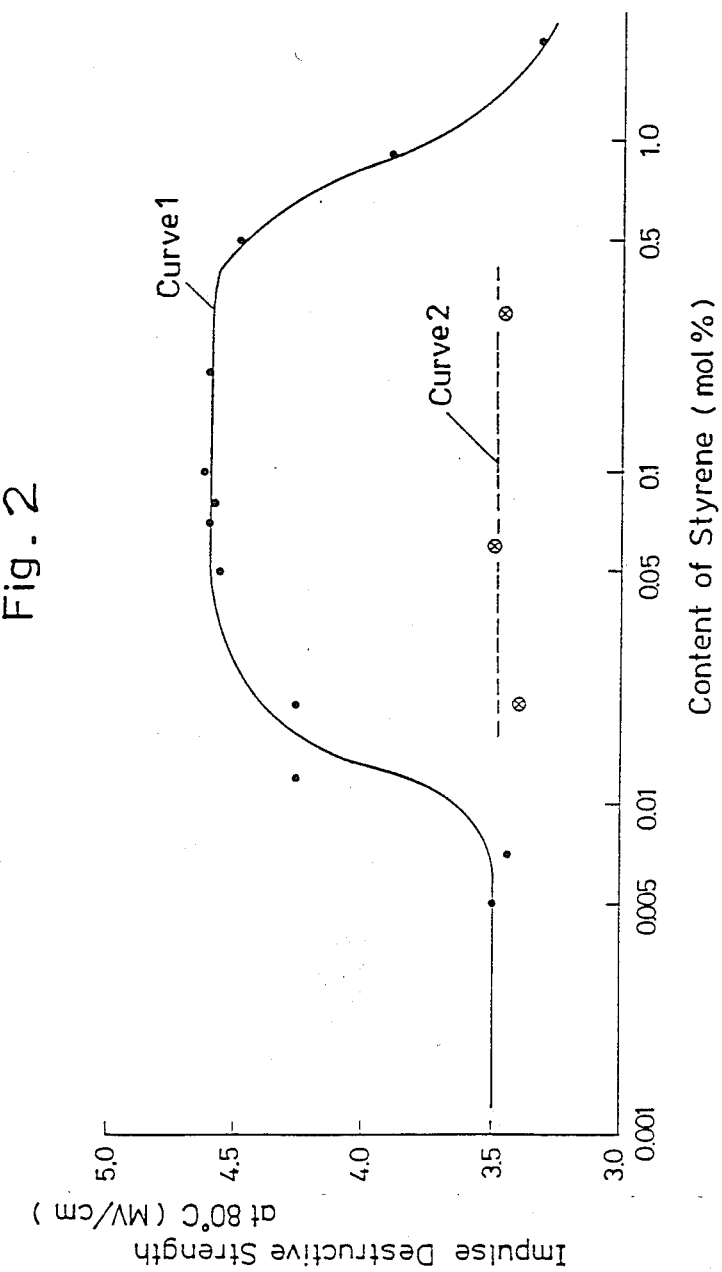
FIG. 2 plots impulse destructive strength.

Further, by the results in Tables 3 and 4 as well as FIG. 2, that is, by the results of the impulse destructive strength at 80° C. regarding the copolymers in Comparative Tests 1 and 2, it has been established that the copolymers having the various styrene contents which were prepared in accordance with the Gloriod patent do not have any effect of improving the impulse destructive strength.

What is claimed is:

1. A method for improving impulse destructive strength of an electrical insulating material which is characterized by employing, as said electrical insulating material, a random copolymer of a styrene series monomer and ethylene or a combination of ethylene and another ethylenically unsaturated monomer, or a composition in which said copolymer is blended with a polymer of ethylene, said copolymer being prepared by introducing, into a reaction system, said styrene series monomer selected from the group of styrene and single-ring substituted styrenes, ethylene or said combination of ethylene and said ethylenically unsaturated monomer and a polymerization initiator, the initiator being introduced thereinto separately from at least said styrene series monomer, and subjecting these monomers to a high-pressure radical copolymerization under a polymerization pressure of 500 to 4,000 kg/cm$^2$ at a polymerization temperature of 50° to 400° C., said polymer or said composition satisfying the following (a) and (b):

(a) a content of said styrene series monomer in said copolymer or said composition being within the range of 0.01 to 1 mol %; and
   (b) a crystallinity of said copolymer or said composition being 30% or more in accordance with X-ray diffraction.

2. A method according to claim 1 wherein said styrene series monomer is previously dispersed into ethylene sufficiently and the resultant dispersion is then introduced into said reaction system.

3. A method according to claim 1 wherein said single-ring substituted styrene is at least one member selected from the group consisting of methylstyrene, dimethylstyrene, ethylstyrene and vinylbenzoic acid.

4. A method according to claim 1 wherein the content of said ethylenically unsaturated monomer in said copolymer is within the range of 0 to 3 mol %.

5. A method according to claim 1 wherein the melt index of said copolymer or said composition is within the range of 0.1 to 20 g/10 minutes.

6. A method according to claim 5 wherein said polymerization pressure is 1,000 to 3,500 kg/cm$^2$, said polymerization temperature is 100° to 350° C. and said content of said styrene series monomer is 0.02 to 0.7 mol %.

7. A method according to claim 6 wherein the content of said ethylenically unsaturated monomer in said copolymer is within the range of 0 to 3 mol % and said styrene series monomer is styrene or alpha methyl styrene.

8. A method according to claim 1 wherein said polymerization pressure is 1,000 to 3,500 kg/cm$^2$, said polymerization temperature is 100° to 350° C. and said content of said styrene series monomer is 0.02 to 0.7 mol %.

9. A method according to claim 8 wherein the content of said ethylenically unsaturated monomer in said copolymer is within the range of 0 to 3 mol % and said styrene series monomer is styrene or alpha methyl styrene.

10. A method according to claim 9 wherein the content of said ethylenically unsaturated monomer is 0 mol % and said styrene series monomer is styrene.

* * * * *